United States Patent Office 2,759,971
Patented Aug. 21, 1956

2,759,971
2-AMINO AND ACYLAMINO-1-(HYDROCARBYL-MERCAPTOPHENYL)-1,3-PROPANEDIOLS AND PREPARATION THEREOF

Royal A. Cutler, Troy, and Chester M. Suter, Albany, N. Y., assignors to Sterling Drug Inc., New York, N. Y., a corporation of Delaware No Drawing. Application October 1, 1951, Serial No. 249,206

28 Claims. (Cl. 260—562)

This invention relates to certain 2-amino and acylamino - 1 - (4-hydrocarbylmercaptophenyl)-1,3-propanediols and to preparation of the same.

More particularly, this invention relates to new compounds having the formula

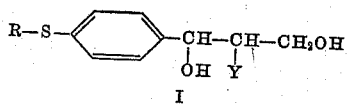

I where R is a hydrocarbyl radical having 1–7 carbon atoms, and Y is an aliphatic carboxylic acylamino radical. The hydrocarbyl radical R includes aliphatic, cycloaliphatic, carbocyclic aryl, and benzyl radicals having 1–7 carbon atoms and represents, for example: branched and unbranched alkyl radicals, such as methyl, ethyl, n-propyl, n-butyl, isobutyl, n-heptyl, isoamyl, etc.; alkenyl radicals, such as allyl, methallyl, etc.; cycloalkyl radicals, such as cyclohexyl, cyclopentyl, etc.; benzyl; phenyl; and ortho-, meta-, and para-tolyl radicals. The acylamino radicals represented by Y include both saturated and unsaturated aliphatic carboxylic acylamino radicals wherein the aliphatic carboxylic acyl group can be considered as being derived from an aliphatic carboxylic acid. Thus, for example, Y can be alkanoylamino, haloalkanoylamino, nitroalkanoylamino, alkylmercapto-alkanoylamino, etc. We particularly prefer acyclic lower aliphatic carboxylic acylamino radicals containing 1–4 carbon atoms. This preferred group of acyl radicals includes, for example, acetylamino, dichloroacetylamino, dibromoacetylamino, bromoacetylamino, beta-chloropropionylamino, difluoroacetylamino, alpha-chloropropionylamino, trichloroacetylamino, nitroacetylamino, methyl-mercaptoacetylamino, ethylmercaptoacetylamino, butyrylamino, alpha-methylpropionylamino, alpha,alpha - dichloropropionylamino, iodoacetylamino, cyanoacetylamino, methoxyacetylamino, acrylylamino, alpha-hydroxypropionylamino, etc.

The following groups of compounds embraced by the generic formula hereinabove are illustrative of the products of our invention:

2 - haloalkanoylamino-1-(4-alkylmercaptophenyl)-1,3-propanediols, having the formula

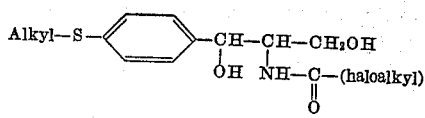

2 - alkanoylamino-1-(4-alkylmercaptophenyl)-1,3-propanediols, having the formula

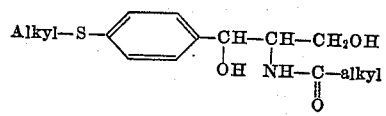

2-haloalkanoylamino-1-(4-alkenylmercaptophenyl)-1,3-propanediols, having the formula

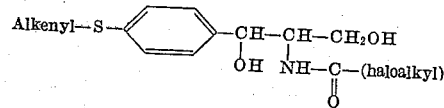

2-haloalkanoylamino-1-(4-benzylmercaptophenyl) - 1,3-propanediols, having the formula

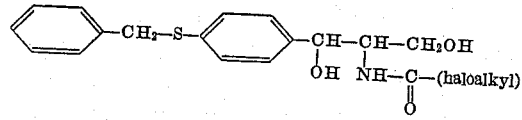

2 - nitroalkanoylamino-1-(4-alkylmercaptophenyl)-1,3-propanediols, having the formula

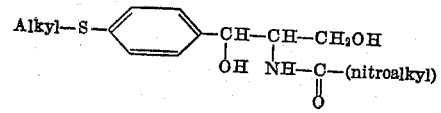

2 - alkylmercaptoalkanoylamino - 1 - (4-alkylmercaptophenyl)-1,3-propanediols, having the formula

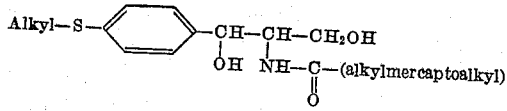

2-haloalkanoylamino-1-(4-phenylmercaptophenyl)-1,3-propanediols, having the formula

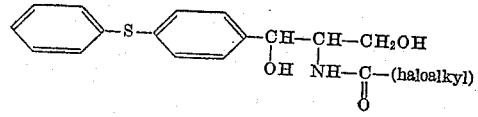

2-nitroalkanoylamino-1-(4-cycloalkylmercaptophenyl)-1,3-propanediols, having the formula

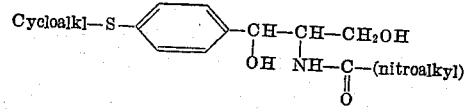

The 2-aliphatic carboxylic acylamino-1-(4-hydrocarbylmercaptophenyl)-1,3-propanediols of our invention are useful as antibiotic agents, being particularly valuable as antimicrobial agents. For example, they exhibit bactericidal and bacteriostatic action against gram-negative and gram-positive bacteria and rickettsial organisms. Our new compounds are also useful as intermediates for the preparation of other valuable organic substances. Thus, they can be oxidized by per-compounds to produce the corresponding 2-aliphatic carboxylic acylamino-1-(4-hydrocarbylsulfonylphenyl)-1,3-propanediols as described and claimed in the copending U. S. patent application, Ser. No. 249,213, filed October 1, 1951 by Chester M. Suter.

In accordance with the invention, our new compounds are obtained by the following process. An alpha-(aliphatic carboxylic acylamino) - 4 - hydrocarbylmercaptoacetophenone (II) is treated with formaldehyde in the presence of sodium bicarbonate or equivalent alkaline condensation catalyst, thereby producing an alpha-(aliphatic carboxylic acylamino)-beta-hydroxy-4-hydrocarbylmercaptopropiophenone (III); and the propiophenone derivative (III) thus obtained is reduced by treatment with an oxidizable aluminum lower alkoxide, thereby yielding the desired 2-(aliphatic carboxylic acylamino)-1-(4 - hydrocarbylmercaptophenyl)-1,3-propanediol) (I).

The reactions involved in our process are represented by the following equations:

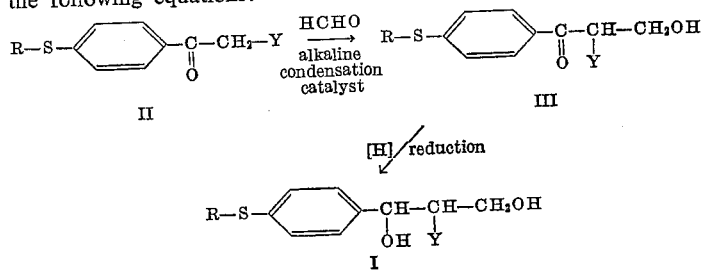

In the initial, or hydroxymethylation, step of our process, formaldehyde in the form of a gas, aqueous or alcoholic solution or paraformaldehyde is interacted with the acylamino-ketone (II). This reaction is most conveniently carried out at 20–50° C., but temperatures considerably above and below this temperature range, for example in the range 0–70° C., also afford satisfactory results. The amount of catalyst employed is not critical, but for best results we prefer to employ the smallest amount of catalyst sufficient to bring about a reasonably rapid reaction. In general, about 0.01–0.10 mole of the catalyst is sufficient to afford satisfactory results.

The latter, or reduction, step of our process can be carried out by treating the propiophenone derivative (III) obtained by the hydroxymethylation step with an oxidizable aluminum lower alkoxide. This reduction step is carried out in an organic solvent which advantageously is a lower secondary alkanol. For purposes of convenience, we prefer to employ a lower alkanol corresponding to the lower alkoxide. The reduction can be carried out by heating the reaction mixture at 20–100° C. for several hours or until the reaction is completed. When a lower alkanol solvent is employed, we generally boil the reaction mixture while providing for slow distillation of the carbonyl compound, i. e. aldehyde or ketone, which is formed by oxidation of the lower alkanol while the propiophenone derivative (III) is simultaneously reduced. We generally prefer to employ as the reducing agent aluminum isopropoxide in isopropanol or aluminum sec.-butoxide in sec.-butanol. While as little as one equivalent of the alkoxide can be employed in the reduction, we generally prefer to employ about 1.5–2.0 equivalents of the aluminum alkoxide per equivalent of the propiophenone derivative (III) in order to assure optimum yields of the reduction product (I).

The alpha-(aliphatic carboxylic acylamino)-4-hydrocarbylmercaptoacetophenones (II) employed as starting materials in our process are readily obtained, for example, by treating the appropriate alpha-amino-4-hydrocarbylmercaptoacetophenones (IV) in conventional fashion with an aliphatic carboxylic acylating agent such as an acyl halide or anhydride. The acylation can be carried out, for example, by heating the acylating agent and the amine (IV) in an anhydrous organic solvent or in an alkaline aqueous solution. The temperature of the reaction can be varied within rather wide limits, but a range of 0–100° C. is generally satisfactory.

The alpha-amino-4-(hydrocarbylmercapto)acetophenones (IV) are themselves conveniently prepared from hydrocarbyl phenyl sulfides in accordance with the following sequence of reactions:

The 2-(aliphatic carboxylic acylamino)-1-(4-hydrocarbylmercaptophenyl)-1,3-propanediols (I) of our invention are readily deacylated by treatment with hot mineral acids to yield the corresponding free amines (IV), having the formula

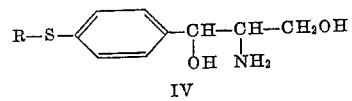

These novel amines (IV) are readily acylated to yield acylamino derivatives and if desired can be readily reconverted to the aliphatic carboxylic acylamino derivatives (I). The amines (IV) react with organic and inorganic acids to form salts. When compounds of our invention wherein the acylamino group is other than acetylamino are desired, it is generally advantageous to prepare them by acylating the appropriate 2-amino-1-(4-hydrocarbylmercaptophenyl)-1,3-propanediol which has been obtained by hydrolysis of the corresponding 2-acetylamino-1-(4-hydrocarbylmercaptophenyl)-1,3-propanediol. It will be appreciated that this acylation of the amino-diol should be carried out under conditions which avoid the undesired acylation of the hydroxyl groups. Thus, the acylation should be carried out at temperatures below about 15° C. when an acid anhydride or acyl halide is employed as the acylating agent. The following is illustrative of this modification of our process. Although, for example, good yields of 2-dichloroacetylamino-1-(4-methylmercaptophenyl)-1,3-propanediol are afforded by the route whereby alpha-amino-4-methylmercaptoacetophenone is dichloroacetylated, the acylation product is hydroxymethylated, and the hydroxymethylation product is reduced, it is economically advantageous to dichloroacetylate 2-amino-1-(4-methylmercaptophenyl)-1,3-propanediol prepared by deacylation of 2-acetylamino-1-(4-methylmercaptophenyl)-1,3-propanediol.

It will be appreciated that in preparing the 2-aliphatic carboxylic acylamino-1-(4-hydrocarbylmercaptophenyl)-1,3-propanediols (I) of our invention using racemic or optically inactive intermediates, the final products will of course be obtained in a racemic or optically inactive form. When it is desired to obtain the optically active forms of the acylaminodiols (I) of our invention, we have found that it is generally most convenient to acylate the appropriate optically active 2-amino-1-(4-hydrocarbylmercaptophenyl)-1,3-propanediol (derived by resolution of the racemic aminodiol) by treatment with an aliphatic carboxylic acyl chloride, anhydride, or lower alkyl ester as set forth hereinabove and illustrated in the following examples.

Our invention is illustrated by the following examples without, however, being limited thereto.

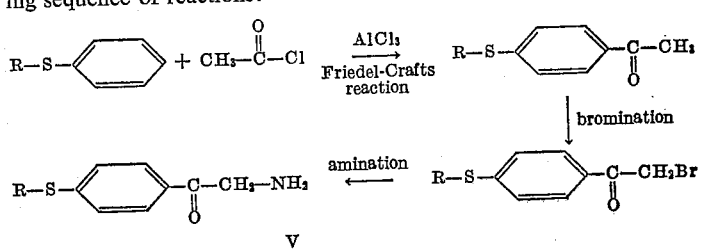

EXAMPLE 1

2-acetylamino-1-(4-methylmercaptophenyl)-1,3-propanediol

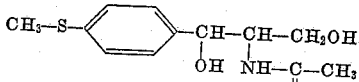

A. ALPHA-AMINO-4-METHYLMERCAPTOACETOPHENONE HYDROCHLORIDE 110 g. of thiophenol was added with stirring to a mixture of 90 ml. of 35% aqueous sodium hydroxide solution and 400 ml. of water in a 2-liter, 3-neck flask. To the resulting mixture, there was added 139 g. of methyl sulfate from a dropping funnel at such a rate that the temperature of the reaction mixture did not rise above 60° C. while applying external ice cooling to the reaction vessel. The addition of the methyl sulfate required about five to ten minutes. After the addition of methyl sulfate was completed, stirring of the reaction mixture was continued for about one hour, and then the mixture was cooled. The thioanisole which separated from the mixture was dissolved in about 400 ml. of chloroform. The chloroform solution was separated, washed with 100 ml. of dilute aqueous sodium hydroxide solution, and dried over anhydrous calcium sulfate. (In other experiments, isolation of the product from the chloroform solution resulted in recovery of thioanisole in a yield of 90–95% of the theoretical based on the quantity of thiophenol employed).

The chloroform solution of thioanisole was filtered free from the calcium sulfate directly into a 2-liter, 3-neck flask fitted with a stirrer, thermometer, dropping funnel, and outlet tube (for escape of hydrogen chloride gas) protected by a drying tube. Sufficient anhydrous chloroform was added to the filtrate to bring the volume up to about 800 ml. and the solution was cooled by means of an ice-methanol bath. 165 g. of aluminum chloride was then added rapidly to the chloroform solution, while keeping the temperature of the solution below 10° C. 106 g. of acetyl chloride was added to the solution by means of a dropping funnel while still maintaining the temperature of the reaction mixture below 10° C. As the addition of the acetyl chloride proceeded, a yellow solid gradually separated from the mixture. (In some instances, it was found desirable to add an additional quantity of dry chloroform to the reaction mixture in order to facilitate stirring.) When the addition of the acetyl chloride was completed, the cooling bath was removed and the reaction mixture was allowed to warm to 20° C. while continuing vigorous stirring. The thick reaction mixture was then decomposed by pouring it into a liter of ice and water containing 30–50 ml. of concentrated hydrochloric acid with vigorous stirring to ensure complete decomposition of the complex. The chloroform layer, which contained 4-methylmercaptoacetophenone, having the formula

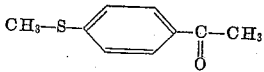

was separated and employed directly in the subsequent step. (In other experiments, by evaporation of the chloroform solution there was obtained in 96–98% yield 4-methylmercaptoacetophenone in a high degree of purity.)

The chloroform solution of 4-methylmercaptoacetophenone was placed in a 3-liter, 3-neck flask fitted with a stirrer, a dropping funnel, and an outlet tube for escape of hydrogen bromide gas. The volume of the chloroform solution was brought up to about 1600 ml. by addition of chloroform. About 40 g. of bromine was added to the solution and the mixture was allowed to stand until the reaction was initiated, as evidenced by evolution of hydrogen bromide. Stirring of the mixture was then begun and a further quantity of 120 g. of bromine was added during a period of three to five minutes. The reaction mixture was then placed under reduced pressure by application of a water aspirator in order to remove the major portion of the hydrogen bromide. The temperature of the solution, which contained alpha-bromo-4-methylmercaptoacetophenone, having the formula

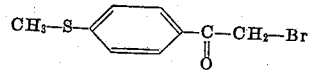

gradually fell, due to evaporation, to about 10–15° C. (A sample of this bromo ketone, isolated in another experiment, was obtained in the form of small white leaflets, which melted at 65.5–66.5° C., after recrystallization from methanol.)

To the cold chloroform solution of alpha-bromomethylmercaptoacetophenone, there was added 140 g. of hexamethylenetetramine. The temperature of the mixture rose gradually to about 30–35° C., and a white solid separated from the mixture. The mixture was stirred for about two hours and then the solid was collected on a filter and washed with chloroform. The product thus obtained consisted of alpha-bromo-4-methylmercaptoacetophenone-hexamethylenetetramine adduct, having the formula

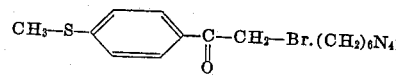

and melting at approximately 140° C. with decomposition.

The alpha-bromo-4-methylmercaptoacetophenone-hexamethylenetetramine adduct obtained in the preceding step was placed in a 3-liter flask with 750 ml. of ethanol and 375 ml. of concentrated hydrochloric acid. As the mixture was stirred, producing a slurry, the solid gradually went into solution. The reaction product subsequently began to separate from the solution. The reaction mixture was then cooled to 10° C., filtered, and the filter cake was washed with 100 ml. of cold ethanol. The damp filter cake was then slurried for a few minutes at 40–50° C. with 600 ml. of water containing 25 ml. of concentrated hydrochloric acid. After cooling the slurry to 5–10° C., the white solid was collected on a filter, washed with 100 ml. of water containing 5 ml. of concentrated hydrochloric acid, and dried. There was thus obtained 135–141 g. of alpha-amino-4-methylmercaptoacetophenone hydrochloride, having the formula

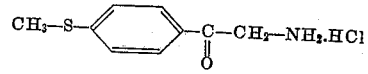

A sample of this product when recrystallized from water formed large white leaflets which melted at 234.5–235° C. (dec.).

B. ALPHA-ACETYLAMINO-4-METHYLMERCAPTOACETOPHENONE

A slurry of 11 g. of alpha-amino-4-methylmercaptoacetophenone hydrochloride in 50 ml. of water containing 100 g. of ice was stirred vigorously and to the slurry there were added in one portion 10 ml. of acetic anhydride followed by a solution of 14.5 g. of sodium acetate trihydrate in 60 ml. of water. The temperature of the reaction mixture, which did not rise during addition of the acetic anhydride and sodium acetate, was allowed to warm to room temperature (about 25° C.) and stirring was continued for an additional two hours. Sufficient concentrated hydrochloric acid was then added to make the reaction mixture acid to Congo Red paper (to dissolve any unreacted aminoketone), and the white solid in the mixture was then collected on a filter. This solid was washed with 30 ml. of water and dried. There was thus obtained 10 g. of alpha-acetylamino-4-methylmercaptoacetophenone, having the formula

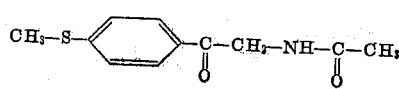

which melted at 133.2–134.6° C. after recrystallization from acetone in the form of broad white needles.

C. ALPHA-ACETYLAMINO-BETA-HYDROXY-4-METHYL-MERCAPTOPROPIOPHENONE

A mixture of 15 g. of alpha-acetylamino-4-methylmercaptoacetophenone, 70 ml. of ethanol, 25 ml. of water, 10 ml. of formalin (37% aqueous solution of formaldehyde), and a solution of 0.3 g. of sodium bicarbonate in 10 ml. of water was stirred at 35° C. for two hours. The original thick slurry gradually thinned out and after about ten minutes the reaction mixture was a pale yellow solution. At the end of the two-hour period, the solution was refrigerated for about ten hours. The crystalline solid which separated from the cooled solution was collected on a filter and washed with 20 ml. of water. There was thus obtained 10.5 g. of alpha-acetylamino-beta-hydroxy-4-methylmercaptopropiophenone, having the formula

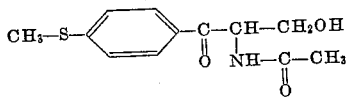

This product was purified by recrystallization from ethyl acetate to yield white fluffy needles which melted at 125.6–127.8° C.

D. 2-ACETYLAMINO-1-(4-METHYLMERCAPTOPHENYL)-1,3-PROPANEDIOL

A mixture of 5 g. of alpha-acetylamino-beta-hydroxy-4-methylmercaptopropiophenone, 20 g. of aluminum isopropoxide, and 120 ml. of isopropanol was slowly distilled through a fifteen-inch column until the distillate gave no test for acetone. This distillation required about seven hours. The excess isopropanol was then distilled from the reaction mixture and the residue was heated for thirty minutes with a solution of 10 g. of sodium chloride in 100 ml. of water. The resulting suspension was filtered while hot and the aluminum hydroxide residue thus collected was washed several times with ether. From the filtrate there separated a white solid in the form of tiny leaflets. This solid was collected on a filter and washed with 15 ml. of ether. There was thus obtained 1.5 g. of 2-acetylamino-1-(4-methylmercaptophenyl)-1,3-propanediol, which melted at 167–168° C. Recrystallization from water and then nitroethane raised the melting point to 172.1–173.5° C.

EXAMPLE 2

*2-dichloroacetylamino-1-(4-methylmercaptophenyl)-1,3-propanediol*

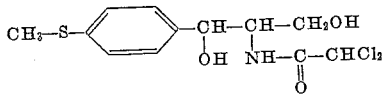

A. 2-AMINO-1-(4-METHYLMERCAPTOPHENYL)-1,3-PROPANEDIOL

A mixture of 50 parts by weight of racemic 2-acetylamino-1-(4-methylmercaptophenyl)-1,3-propanediol obtained as described above in Example 1, 100 parts by weight of concentrated hydrochloric acid, and 500 parts by weight of water was warmed on a steam bath for thirty minutes. The resulting solution was cooled to about 40° C. and was then made strongly alkaline by addition of 35% aqueous sodium hydroxide solution. The alkaline solution was then refrigerated. The white solid which separated from the cooled solution was collected on a filter. There was thus obtained 27 parts by weight of 2-amino-1-(4-methylmercaptophenyl)-1,3-propanediol, having the formula

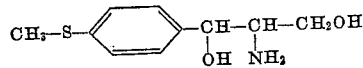

This product melted at 130.7–131.9° C. after recrystallization from methanol.

A solution of 17.5 g. of the 2-amino-1-(4-methylmercaptophenyl)-1,3-propanediol described above, which of course was a racemic or optically inactive form of the compound, in 100 ml. of methanol and a solution of 13 g. of d-tartaric acid in 100 ml. of methanol were mixed and the mixture was allowed to stand at 15–20° C. for about six hours. The solid which had separated from the solution during this period was then collected on a filter, the methanolic filtrate being retained for treatment as described below. There was thus obtained 18 g. of solid which melted at 190–196° C. This solid was suspended in 150 ml. of water and sufficient dilute hydrochloric acid was added to effect solution of the solid. To the solution thus obtained there was added 50 ml. of 35% aqueous sodium hydroxide solution which caused the separation of 11.7 g. of yellowish solid from solution. This solid melted at 127–135° C. Two recrystallizations of this product from methanol yielded 1.5 g. of coarse white needles which melted at 152–153° C. This product was a levo-rotary form of 2-amino-1-(4-methylmercaptophenyl)-1,3-propanediol having $\alpha_D^{25} = -21°$ (1% solution in 95% ethanol).

The methanolic filtrate retained above was distilled on the steam bath to remove the methanol. The residue thus obtained was dissolved in 50 ml. of water and the resulting solution was treated with 15 ml. of 35% caustic solution. This caused the separation of 3.0 g. of white solid which melted at 141–150° C. This product was recrystallized twice from methanol, thus yielding 1.0 g. of white crystals consisting of a dextro-rotary form of 2-amino-1-(4-methylmercaptophenyl)-1,3-propanediol which melted at 152–153° C. and had $\alpha_D^{25} = +21°$ (1% solution in 95% ethanol).

The racemic amine was also resolved in the following manner: 33.0 g. of racemic 2-amino-1-(4-methylmercaptophenyl)-1,3-propanediol and 34.6 g. of d-N-benzoylthreonine (M. P. 149–151° C.; obtained by benzoylation of d-threonine) were dissolved in 500 ml. of methanol by warming. Crystallization was initiated by cooling the solution to 25° C. and scratching the inner walls of the container. The solution was refrigerated at 5° C. for about ten hours and then the crystals which had separated from solution were collected on a filter, the filtrate (A) being retained for recovery of the dextro-rotary amine as described below. The solid on the filter was washed with a few ml. of cold methanol and dried at 70° C. There was thus obtained 31.3 g. of levo-rotary-2-amino-1-(4-methylmercaptophenyl)-1,3-propanediol d-N-benzoylthreonine salt which melted at 184–186° C. This crop of salt was dissolved in 100 ml. of water containing 6.2 ml. of concentrated hydrochloric acid and the solution was then made alkaline by addition of 13 ml. of 35% aqueous sodium hydroxide solution. 20 g. of sodium chloride was dissolved in this solution which was then cooled to 5° C. A heavy crop of crystals separated from the solution and this solid was collected on a filter, washed with a little saturated aqueous sodium chloride solution and dried at 70° C. There was thus obtained 15.0 g. of crude levo-rotary 2-amino-1-(4-methylmercaptophenyl)-1,3-propanediol which melted at 147–150° C. This product was recrystallized from 150 ml. of methanol to yield 11.9 g. of the pure levo-rotary amine which melted at 151–153° C. By concentrating the mother liquor, 3.0 g. of solid consisting largely of the racemic amine was recovered.

The filtrate (A) retained as indicated above was evaporated at reduced pressure. The residue thus obtained was dissolved in 100 ml. of water containing 62 ml. of concentrated hydrochloric acid and the solution was made alkaline by addition of 13 ml. of 35% aqueous sodium hydroxide solution. 20 g. of sodium chloride was dissolved in this solution which was then cooled to 5° C. The heavy crop of crystalline solid which separated from the solution was collected on a filter, washed with a few ml. of saturated aqueous sodium chloride solution and dried at 70° C. There was thus obtained 13.5 g. of crude dextro-rotary 2-amino-1-(4-methylmercaptophenyl)-1,3-propanediol. This product was recrystallized from methanol to yield 8.5 g. of the pure dextro-rotary amine which melted at 151–153° C. By concentrating the mother liquor, 5.0 g. of solid consisting largely of the racemic amine was recovered.

B. 2-DICHLOROACETYLAMINO-1-(4-METHYLMERCAPTO-PHENYL)-1,3-PROPANDIOL

A mixture of 1.1 g. of levo-rotary 2-amino-1-(4-methylmercaptophenyl)-1,3-propanediol, obtained as described above in part A, and 1.6 ml. of ethyl dichloroacetate was heated on a steam bath for three hours. The resulting viscous yellow oil was dissolved in 25 ml. of ethylene chloride and filtered hot with charcoal, and the filtrate was allowed to cool to about 25° C. From the filtrate there separated 0.92 g. of tiny white leaflets which were collected on a filter. Recrystallization of this product, which was a dextro-rotary form of 2-dichloroacetylamino - 1 - (4 - methylmercaptophenyl) - 1,3 - propanediol, from nitroethane yielded the pure product, which melted at 111.6–112.6° C. and had $\alpha_D^{25} = +12°$ (1% solution in 95% ethanol).

In similar fashion, the dextro-rotary 2-amino-1-(4-methylmercaptophenyl) - 1,3 - propanediol was acylated with ethyl dichloroacetate to yield a levo-rotary form of 2-dichloroacetylamino-1-(4-methylmercaptophenyl) - 1,3-propanediol, which melted at 111.6–112.6° C. and had $\alpha_D^{25} = -12°$ (1% solution in 95% ethanol).

Also, in analogous fashion, the dichloroacetylation of the racemic amine yielded a racemic 2-dichloroacetylamino-1-(4-methylmercaptophenyl)-1,3-propanediol, M. P. 101.2–102.4° C.

The racemic and the dextro-rotary forms of 2-dichloroacetylamino - 1 - (4 - methylmercaptophenyl) - 1,3 - propanediol described above each were found to have especially high antibiotic activity, being active against gram-negative and gram-positive bacteria and rickettsial organisms. In general, the dextro-rotary form of the compound was found to have approximately twice the antibacterial activity of the racemic form.

EXAMPLE 3

*2-dibromoacetylamino-1-(4-methylmercaptophenyl)-1,3-propanediol*

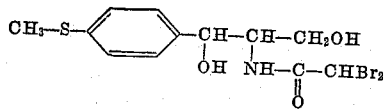

By refluxing the racemic 2-amino-1-(4-methylmercaptophenyl)-1,3-propanediol described above in part A of Example 2 with methyl dibromoacetate for about one hour using anhydrous ethanol as a reaction solvent, there is produced a racemic 2-dibromoacetylamino-1-(4-methylmercaptophenyl)-1,3-propanediol. In analogous fashion, the dibromoacetylation of the levo-rotary 2-amino-1-(4-methylmercaptophenyl) - 1,3 - propanediol yields a dextro-rotary form of the 2-dibromoacetylamino-1-(4-methylmercaptophenyl)-1,3-propanediol, and the enantiomeric dextro-rotary amino-diol yields a levo-rotary form of the 2-dibromoacetylamino-1-(4-methylmercaptophenyl)-1,3-propanediol.

EXAMPLE 4

*2-dichloroacetylamino-1-(4-methylmercaptophenyl)-1,3-propanediol*

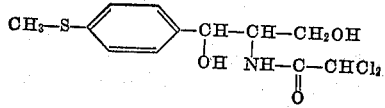

A. ALPHA-DICHLOROACETYLAMINO-4-METHYLMERCAPTOACETOPHENONE 217.7 g. of alpha-amino-4-methylmercaptoacetophenone hydrochloride obtained as described in part A of Example 1 was mixed with 4.5 liters of anhydrous benzene at 27° C. 166 g. of dichloroacetyl chloride was added in one portion to the mixture, and the resulting mixture was refluxed and stirred for fifteen to eighteen hours. After this period most of the solid had gone into solution. The reaction mixture was filtered hot through a preheated funnel and the filtrate was allowed to cool. The solid which separated from solution was collected on a filter, washed with benzene, and dried. There was thus obtained 230 g. of alpha-dichloroacetamido-4-methylmercaptoacetophenone having the formula

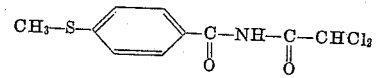

Recrystallization of this product from acetone yielded white needles which melted at 151.7–152.9° C.

B. ALPHA-DICHLOROACETYLAMINO-BETA-HYDROXY-4-METHYLMERCAPTOPROPIOPHENONE 292.2 g. of alpha-dichloroacetylamino-4-methylmercaptoacetophenone was slurried with 14.5 liters of ethanol at 40° C. 15 g. of sodium bicarbonate and 150 ml. of formalin (37% aqueous solution of formaldehyde) were added to the mixture and stirring was continued while maintaining the temperature of the solution at 40–50° C. until all of the alpha-dichloroacetylamino-4-mercaptoacetophenone had gone into solution. This required about eight hours. The suspended sodium bicarbonate was then removed by filtration and the volume of the filtrate was reduced to 2–2.5 liters by evaporation of ethanol from the solution under reduced pressure. The residual solution, which had an orange color, was refrigerated for about ten hours. The solid which separated from the solution was collected on a filter. There was thus obtained 232 g. of alpha-dichloroacetylamino-beta-hydroxy - 4 - methylmercaptopropiophenone having the formula

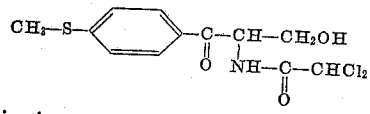

Recrystallization of this product from ethylene chloride yielded tiny white leaflets which melted at 147.7–148.5° C.

C. 2-DICHLOROACETYLAMINO-1-(4-METHYLMERCAPTOPHENYL)-1,3-PROPANEDIOL 322.2 g. of alpha-dichloroacetylamino-beta-hydroxy-4-methylmercaptopropiophenone, 420 g. of aluminum isopropoxide, and three liters of anhydrous isopropanol were placed in a 5-liter flask and the mixture was heated at such a rate that distillation of liquid through a 15-inch column occurred at the rate of one drop per three to five seconds. Distillation was continued for sixteen to eighteen hours after which time a test for acetone in the distillate was negative. The test for acetone was carried out using a 0.1% solution of 2,4-dinitrophenylhydrazine in accordance with the procedure described in Organic Reactions, vol. II, John Wiley and Sons, page 200 (1944). The isopropanol remaining in the reaction mixture was removed by evaporation at reduced pressure. The dark red viscous residue thus obtained was heated on a steam bath for about forty-five minutes with 2.5 liters of water containing 200 g. of sodium chloride. The sodium chloride was added to reduce the tendency of aluminum hydroxide to form a gel. The hot suspension was filtered to remove aluminum hydroxide. The collected aluminum hydroxide was slurried several times with ether to remove the adhering red oil and the ether extracts were combined with the filtrate. The combined ether solutions were dried over anhydrous calcium sulfate and the ether was removed from the dry solution by distillation. There was thus obtained 310–320 g. of a dark red viscous oil. This oil was dissolved in 1600 ml. of ethylene dichloride, filtered with charcoal, and the filtrate was cooled. The solid which separated from the filtrate consisted of 180–195 g. of 2-dichloroacetylamino-1-(4-methylmercaptophenyl)-1,3-propanediol, which melted at 98–100° C. This product was purified by recrystallization from 550 ml. of nitroethane followed by an additional recrystallization from ethylene chloride. There was thus obtained 125 g. of the pure product which melted at 101.2–102.4° C.

In another experiment, the reduction step was carried out in the following manner. A mixture of 9.6 g. of alpha-dichloroacetylamino-beta-hydroxy - 4 - methylmercaptopropiophenone, 6.5 g. of aluminum isopropoxide, and 90 ml. of anhydrous isopropanol was refluxed for about thirty-five minutes with provision for slow distillation of acetone and isopropanol from the solution. The remaining solvent was then removed by evaporation at reduced pressure. The residue thus obtained yielded 5.8 g. of 2 - dichloroacetylamino - 1 - (4 - methylmercaptophenyl)-1,3-propanediol which melted at 101.2–102.4° C.

EXAMPLE 5

*2-dichloroacetylamino-1-(4-ethylmercaptophenyl)-1,3-propanediol*

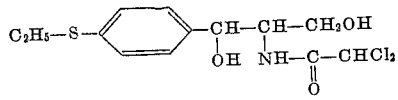

A. ALPHA-AMINO-4-ETHYLMERCAPTOACETOPHENONE HYDROCHLORIDE 337 g. of ethyl sulfate was added from a dropping funnel to a stirred solution of 200 g. of thiophenol in 800 ml. of 10% aqueous sodium hydroxide solution. The reaction mixture was then stirred for two hours. During this period the temperature of the mixture gradually rose to 65° C. and then decreased to room temperature (about 25° C.) and the desired reaction product, ethyl phenyl sulfide, separated from the mixture as an oil. This oil was extracted from the mixture with 800 ml. of chloroform. The chloroform solution of ethyl phenyl sulfide thus obtained was dried for several hours over anhydrous calcium sulfate. The dry solution was then placed in a 3-liter, 3-neck flask fitted with a stirrer, thermometer, and drying tube. The solution was stirred and cooled to −10° C. and 175 ml. of acetyl chloride was added. 300 g. of anhydrous aluminum chloride was then added portionwise while keeping the temperature of the reaction mixture at 5–15° C. After the addition of the aluminum chloride was completed, the reaction mixture was allowed to warm to 20° C. and was poured into about 2 kg. of ice. The chloroform layer, which contained the desired 4-ethylmercaptoacetophenone, was separated from the mixture and placed in a 5-liter, 3-neck flask fitted with a stirrer and dropping funnel. To the stirred solution there was added 75 g. of bromine. After the reaction was initiated, as shown by the evolution of hydrogen bromide, an additional 225 g. of bromine was added as rapidly as was practical. The hydrogen bromide evolved from the mixture was removed by applying reduced pressure to the stirred solution, which contained alpha-bromo-4-ethylmercaptoacetophenone, having the formula

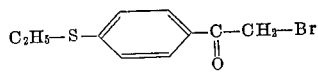

(A sample of the bromoketone isolated in another experiment melted at 74.4–75.4° C. after recrystallization from petroleum ether followed by recrystallization from methanol.) To the residue thus obtained, there was added 256 g. of hexamethylenetetramine, and the mixture was stirred for two hours. The solid yellowish alpha-bromo-4-ethylmercaptoacetophenone - hexamethylenetetramine adduct having the formula

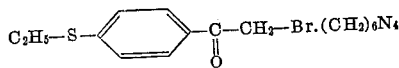

was collected on a filter, washed with chloroform and sucked partially dry on the filter. The adduct was mixed with 760 ml. of concentrated hydrochloric acid and 1540 ml. of ethanol, and the mixture was stirred for about six hours. The resulting suspension was cooled to 5° C., and was filtered and washed with about 200 ml. of ethanol. The solid was then slurried with one liter of warm water containing 20 ml. of concentrated hydrochloric acid. This suspension was cooled to 5° C. and then filtered. The collected solid was washed with about 300 ml. of ice water and dried. There was thus obtained 211 g. of alpha-amino-4-ethylmercaptoacetophenone hydrochloride, having the formula

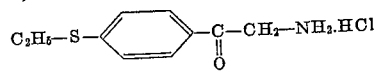

This product melted at 186.5° C. (dec.) after recrystallization from water which had been made slightly acid with dilute hydrochloric acid.

B. ALPHA-DICHLOROACETYLAMINO-4-ETHYLMERCAPTOACETOPHENONE

A mixture of 200 g. of alpha-amino-4-ethylmercaptoacetophenone hydrochloride and 4.5 liters of benzene was placed in a 12-liter, 3-neck flask fitted with a stirrer and a reflux condenser with water trap. The benzene was distilled slowly until no more water collected in the water trap. 147 g. of dichloroacetyl chloride was added to the mixture in a single portion and the resulting mixture was refluxed for fifteen hours. The evolution of hydrogen chloride had practically ceased at the end of this period and all of the solid in the mixture had dissolved. The hot solution was filtered. On cooling, there separated from the filtrate 139 g. of white solid which consisted of alpha-dichloroacetylamino-4-ethylmercaptoacetophenone having the formula

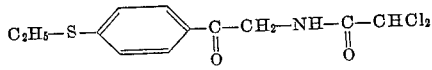

This product melted at 127.6–128.8° C. after recrystallization from ethylene chloride. An additional 66 g. of the product was recovered by evaporation of the filtrate to a volume of 600 ml., cooling, and collecting the solid which separated from solution.

C. ALPHA-DICHLOROACETYLAMINO-BETA-HYDROXY-4-ETHYLMERCAPTOPROPIOPHENONE

A mixture of 200 g. of alpha-dichloroacetylamino-4-ethylmercaptoacetophenone, 100 ml. of formalin (37% aqueous solution of formaldehyde), 1600 ml. of ethanol, and 10 g. of sodium bicarbonate was stirred at 40–50° C. for ten hours. The mixture was allowed to stand at room temperature for about fifteen hours and was then cooled to 10° C. The solid which separated from the cooled solution was collected on a filter, was washed with 150 ml. of ethanol, and dried. There was thus obtained 204 g. of alpha-dichloroacetylamino-beta-hydroxy-4-ethylmercaptopropiophenone, having the formula

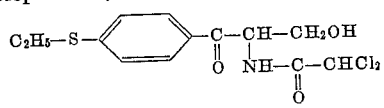

which melted at 150–152° C. When recrystallized in the form of small white leaflets of ethylene chloride, the pure compound melted at 153.2–154.3° C.

D. 2-DICHLOROACETYLAMINO-1-(4-ETHYLMERCAPTOPHENYL)-1,3-PROPANEDIOL

A mixture of 140 g. of alpha-dichloroacetylamino-beta-hydroxy-4-ethylmercaptopropiophenone, 400 g. of aluminum isopropoxide, and 1500 ml. of isopropanol was distilled slowly for fifteen hours. The excess isopropanol was removed by distillation at reduced pressure. Two liters of water containing 200 g. of sodium chloride was added to the red viscous residue and the mixture was heated about thirty minutes on a steam bath. The hot mixture was filtered and the filter cake was washed thoroughly with several 200 ml. portions of ethyl ether. The dark red ether layer was separated from the filtrate, dried over anhydrous calcium sulfate, and the ether was removed by evaporation. There was thus obtained as a residue 128 g. of red oil. This oil was taken up in 400 ml. of benzene and the hot solution was filtered with charcoal. On cooling the filtrate 84 g. of white solid separated from the solution. Recrystallization of this product from 300 ml. of ethylene chloride yielded 73 g. of pure 2-dichloroacetylamino-1-(4-ethylmercaptophenyl)-1,3-propanediol which melted at 92.4–93.4° C.

EXAMPLE 6

*2-dichloroacetylamino-1-(4-n-propylmercaptophenyl)-1,3-propanediol*

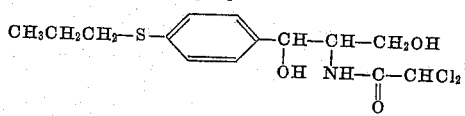

A. ALPHA-AMINO-4-N-PROPYLMERCAPTOACETOPHENONE HYDROCHLORIDE

A suspension of 226 g. of aluminum chloride in one liter of dry chloroform was placed in a 3-liter, 3-neck flask fitted with a stirrer, drying tube, dropping funnel, and thermometer. The suspension was stirred and cooled to 5° C. with stirring and 145 g. of acetyl chloride was added. 235.5 g. of n-propyl phenyl sulfide was then added dropwise at 5° C. The reaction mixture was stirred for fifteen minutes after addition of the sulfide was completed, and was then poured into 1.5 kg. of ice containing 25 ml. of concentrated hydrochloric acid. The chloroform layer was separated from the mixture and the chloroform was removed from the solution by distillation. The residual oil was fractionally distilled, and the fraction boiling at 207° C. at 45–48 mm. of mercury was collected. There was thus obtained 253 g. of colorless oil which solidified upon standing. This product, which was 4-n-propylmercaptoacetophenone, having the formula

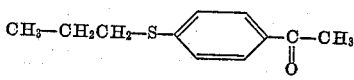

melted at 37.7–39.1° C.

208 g. of bromine was added to a solution of 254 g. of 4-n-propylmercaptoacetophenone in 2 liters of chloroform. After five or ten minutes, the evolution of hydrogen bromide from the reaction mixture had practically ceased, and the mixture was washed with 2 liters of 5% aqueous sodium bicarbonate solution containing ice. The chloroform layer was separated from the mixture and the chloroform was removed from the chloroform solution by distillation at reduced pressure. There was thus obtained as a residue 300 g. of alpha-bromo-4-n-propylmercaptoacetophenone having the formula

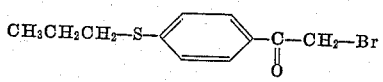

in the form of an orange colored oil which was used directly in the next step of the process. Crystallization of a sample of this product from petroleum ether yielded a white solid which melted at approximately 43° C.

95 g. of hexamethylenetetramine was added with stirring to a solution of 176 g. of alpha-bromo-4-n-propylmercaptoacetophenone dissolved in 850 ml. of acetonitrile. The temperature of the reaction mixture rose from 28° C. to 42° C. and a pale yellow solid separated from solution. After stirring the mixture for two hours, the solid was collected on a filter, washed with two 150 ml. portions of acetonitrile, and with 300 ml. of water, and dried. There was thus obtained, as a pale yellow solid, 174 g. of alpha-bromo-4-n-propylmercaptoacetophenone-hexamethylenetetramine adduct having the formula

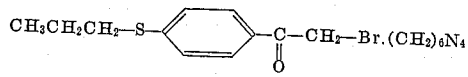

which melted at approximately 135° C. with decomposition.

92 g. of alpha-bromo-4-n-propylmercaptoacetophenone-hexamethylenetetramine adduct was mixed with a solution of 90 ml. of concentrated hydrochloric acid and 225 ml. of methanol, and the mixture was stirred and refluxed for thirty minutes. Initially, the mixture became dark red in color and after about ten minutes ammonium chloride separated from the solution. The ammonium chloride was removed by filtration, and the filtrate was cooled to −5° C. The solid which separated from the cooled solution was collected on a filter and dissolved in 125 mls. of hot water. The aqueous solution was cooled to 0° C. and the solid which separated from solution was collected on a filter. There was thus obtained 27 g. of alpha-amino-4-n-propylmercaptoacetophenone hydrochloride having the formula

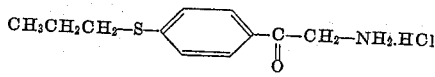

which melted at approximately 155° C. with decomposition.

B. ALPHA-DICHLOROACETYLAMINO-4-n-PROPYLMERCAPTOACETOPHENONE 27 g. of alpha-amino-4-n-propylmercaptoacetophenone hydrochloride was added to 500 ml. of benzene and the resulting mixture was refluxed until no more water distilled off into a water separator. 41 g. of dichloroacetyl chloride was then added and the mixture was stirred and refluxed for thirty minutes. During this period all of the ketoamine dissolved. The resulting reaction mixture was concentrated under reduced pressure, and the residue thus obtained was refrigerated. The solid which separated from the cooled solution was collected on a filter, washed with 5 ml. of benzene, and dried. There was thus obtained 16.5 g. of alpha-dichloroacetylamino-4-n-propylmercaptoacetophenone, having the formula

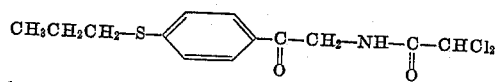

which was recrystallized from benzene as a white solid which melted at 123.2–123.8° C.

C. ALPHA-DICHLOROACETYLAMINO-BETA-HYDROXY-4-n-PROPYLMERCAPTOACETOPHENONE

A mixture of 13 g. of alpha-dichloroacetylamino-4-n-propylmercaptoacetophenone, 100 ml. of ethanol, and 8 ml. of formalin (37% aqueous solution of formaldehyde) containing 0.8 g. of sodium bicarbonate dissolved therein was stirred at 40–43° C. for four hours. The reaction mixture was then cooled and the solid which separated from the solution was collected on a filter. There was thus obtained 12.5 g. of alpha-dichloroacetylamino-beta-hydroxy-4-n-propylmercaptoacetophenone, having the formula

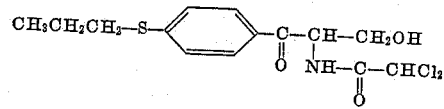

This product was recrystallized from ethylene chloride, thereby yielding 10 g. of the pure compound which melted at 133.4–136.8° C.

D. 2-DICHLOROACETYLAMINO-1-(4-n-PROPYLMERCAPTOPHENYL)-1,3-PROPANEDIOL

A mixture of 9 g. of alpha-dichloroacetylamino-betahydroxy-4-n-propylmercaptopropiophenone, 20 g. of aluminum isopropoxide, and 200 ml. of dry isopropanol was distilled slowly for three hours. The isopropanol remaining in the reaction mixture was removed by distillation at reduced pressure. The resulting brown pasty residue was warmed with 200 ml. of saturated aqueous sodium chloride solution, and then filtered. The residual aluminum hydroxide on the filter was washed with several portions of ether. The ether layer was separated from the filtrate and dried over anhydrous calcium sulfate. The ether was then removed from the ether solution by evaporation at reduced pressure. The dark amber oil obtained as a residue was taken up in 100 ml. of hot benzene, filtered with charcoal, and the filtrate was diluted with petroleum ether just short of permanent turbidity. On standing, there separated from the solution 4 g. of solid which was recrystallized from benzene and then from ethylene chloride. The product thus obtained, which was 2-dichloroacetylamino-1-(4-n-propylmercaptophenyl)-1,3-propanediol, melted at 91.8–94.8° C.

EXAMPLE 7

*2-dichloroacetylamino-1-(4-n-butylmercaptophenyl)-1,3-propanediol*

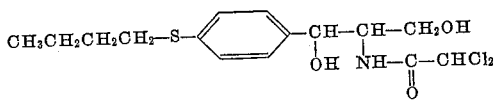

A. ALPHA-AMINO-4-n-BUTYLMERCAPTOACETOPHENONE

This compound was prepared in a manner analogous to that described in part A of Example 6 above for the preparation of the corresponding n-propylmercapto compound. 250 g. of n-butyl phenyl sulfide was treated with 133 g. of acetyl chloride in the presence of 220 g. of aluminum chloride. There was thus obtained 206 g. of 4-n-butylmercaptoacetophenone, having the formula

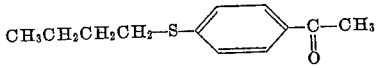

which boiled at 138–140° C. at 0.8 mm. and melted at 24–25° C. after crystallization from petroleum ether at 0° C. 110 g. of 4-n-butylmercaptoacetophenone dissolved in one liter of chloroform was treated with 80 g. of bromine to yield 168 g. of alpha-bromo-4-n-butylmercaptoacetophenone, having the formula

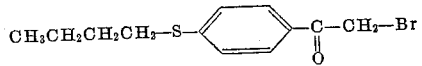

This compound was recrystallized from petroleum ether, thus yielding large colorless crystals which melted at approximately 63° C. 60 g. of alpha-bromo-4-n-butylmercaptoacetophenone dissolved in 300 ml. of acetonitrile was treated with 30 g. of hexamethylenetetramine, thereby producing 88 g. of alpha-bromo-4-n-butylmercaptoacetophenone-hexamethylenetetramine adduct, having the formula

which melted at approximately 113° C. with decomposition.

A mixture of 86 g. of alpha-bromo-4-n-butylmercaptoacetophenone-hexamethylenetetramine adduct, 85 ml. of concentrated hydrochloric acid, and 170 ml. of ethanol was stirred for about ten hours. The ammonium chloride which separated from the mixture as a white solid was removed by filtration and discarded. The filtrate, after partial evaporation at room temperature under reduced pressure, yielded 13.5 g. of a pale yellowish solid which melted at 140–145° C. (dec.). The filtrate from collection of this solid was reduced in volume by evaporation and a further yield of 35 g. of the product was obtained as a brown gummy solid. This gummy solid was suspended in 50 ml. of acetone, the solution was cooled in an ice-methanol bath, the solid which separated from the cooled solution was collected on a filter and washed several times with cold acetone. There was thus obtained 26.5 g. of a yellowish-tan solid which melted at 140–145° C. (dec.). The two crops of product melting at 140–156° C. were combined and the 40 g. of product was recrystallized from 100 ml. of water containing 3 ml. of concentrated hydrochloric acid. There was thus obtained 32.5 g. of alpha-amino-4-n-butylmercaptoacetophenone hydrochloride having the formula

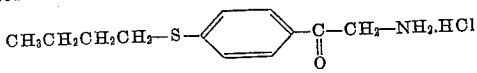

in the form of white flaky crystals. A sample of this product was recrystallized from ethanol and then again from water acidulated with hydrochloric acid to yield the pure compound which melted at 175.5–179.3° C. (dec.).

B. ALPHA-DICHLOROACETYLAMINO-4-n-BUTYLMERCAPTOACETOPHENONE

A mixture of 27 g. of dry alpha-amino-4-n-butylmercaptoacetophenone hydrochloride, 125 ml. of anhydrous benzene, and 15 ml. of dichloroacetyl chloride was stirred and heated for fifteen minutes on a steam bath. The reaction mixture was then cooled and the solid which separated from solution was collected on a filter. There was thus obtained 31.6 g. of alpha-dichloroacetylamino-4-n-butylmercaptoacetophenone having the formula

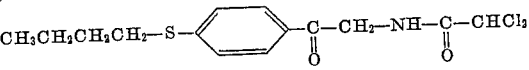

Recrystallization of this product from benzene yielded fluffy white needles which melted at 127.4–128° C. with sintering at 120.2° C.

C. ALPHA-DICHLOROACETYLAMINO-BETA-HYDROXY-4-n-BUTYLMERCAPTOPROPIOPHENONE

A mixture of 47.5 g. of alpha-dichloroacetylamino-4-n-butylmercaptoacetophenone, 300 ml. of ethanol, and 2 g. of sodium bicarbonate dissolved in 23 ml. of formalin (37% aqueous solution of formaldehyde) was heated at 40–45° C. for four hours. The slurry was cooled to 10° C., filtered, and the solid residue was washed with 40 ml. of methanol and dried. There was thus obtained 41 g. of alpha-dichloroacetylamino-beta-hydroxy-4-n-butylmercaptopropiophenone having the formula

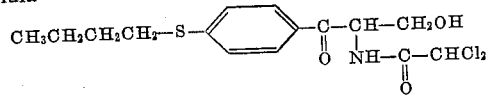

which when recrystallized from benzene in the form of small white crystals, melted at 123.0–123.8° C.

D. 2-DICHLOROACETYLAMINO-1-(4-n-BUTYLMERCAPTOPHENYL)-1,3-PROPANEDIOL 35 g. of alpha-dichloroacetylamino-beta-hydroxy-4-n-butylmercaptopropiophenone, 65 g. of aluminum isopropoxide, and one liter of dry isopropanol were distilled slowly for fifteen hours. The excess isopropanol was removed from the reaction mixture by evaporation under reduced pressure, and the reddish residue thus obtained was heated for thirty minutes with 400 ml. of water containing 40 g. of sodium chloride. The aluminum hydroxide which separated from solution was removed by filtration and the filter cake was washed thoroughly with ether. The reddish ether layer was separated from the filtrate, dried over anhydrous calcium sulfate, and the ether was removed from the ether solution by evaporation under reduced pressure. The light red viscous oily residue thus obtained was taken up in 120 ml. of benzene, filtered with charcoal, and the filtrate was cooled. From the filtrate there separated 14 g. of 2 - dichloroacetylamino - 1 - (4 - n - butylmercaptophenyl)-1,3-propanediol which was recrystallized from benzene and then from ethylene chloride to yield a white waxy solid which melted at 85.5–87° C.

EXAMPLE 8

2-acetylamino-1-(4-benzylmercaptophenyl)-1,3-propanediol

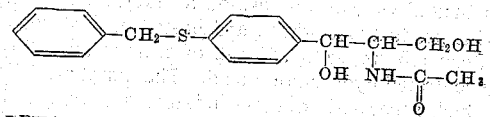

A. ALPHA-AMINO-4-BENZYLMERCAPTOACETOPHENONE HYDROCHLORIDE 340 g. of benzyl phenyl sulfide was dissolved in 1200 ml. of anhydrous chloroform and 120 ml. of acetyl chloride was added to the solution. The resulting mixture was cooled to −10° C. and 226 g. of aluminum chloride was added portionwise at such a rate that the temperature of the reaction mixture did not exceed 0° C. After the addition of the aluminum chloride was completed, the mixture was stirred and allowed to warm to 21° C. The mixture was then poured into ice water. The red chloroform layer was separated from the aqueous layer, washed with 300 ml. of dilute hydrochloric acid, and dried over anhydrous calcium sulfate. The chloroform was then evaporated from the chloroform solution. There was thus obtained as a residue 402 g. of a dark red oil. This oil was dissolved in 1200 ml. of petroleum ether and the resulting solution was filtered hot with charcoal. The yellow filtrate was cooled in an ice bath. 154 g. of yellow solid separated from the cooled solution. This product was recrystallized twice from ethanol and once from petroleum ether. There was thus obtained, in the form of fine white needles which melted at 113.9–115.3° C., 4-benzylmercaptoacetophenone, having the formula

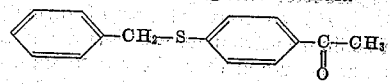

95 g. of 4-benzylmercaptoacetophenone was dissolved in one liter of chloroform and was treated with 62.5 g. of bromine by a procedure similar to the bromination described above in Example 1A. To the solution of alpha-bromo-4-benzylmercaptoacetophenone thus obtained there was added 56 g. of hexamethylenetetramine and the mixture was stirred for two hours. The pinkish-white solid which separated was collected on a filter and washed with 200 ml. of chloroform. The resulting crude alpha-bromo-4-benzylmercaptoacetophenone-hexamethylenetetramine adduct, having the formula

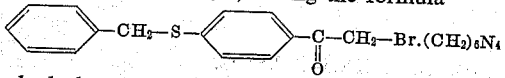

was hydrolyzed directly by stirring it for about ten hours at room temperature (about 25° C.) with 180 ml. of concentrated hydrochloric acid and 360 ml. of ethanol. The reaction mixture was then cooled to 10° C. The solid was collected on a filter and dried. There was thus obtained 145 g. of crude reaction product. Ammonium chloride was removed from this product by slurrying it with 400 ml. of hot water for ten minutes and then cooling the solution to 10° C. 67 g. of solid separated from the cooled solution. This product was further purified by recrystallization from water containing a little hydrochloric acid. There was thus obtained alpha-amino-4-benzylmercaptoacetophenone hydrochloride, having the formula

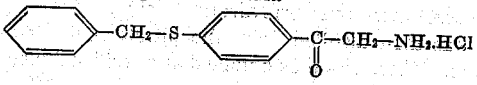

in the form of white leaflets which melted at 214.5–216.5° C. (dec.).

B. ALPHA-ACETYLAMINO-4-BENZYLMERCAPTOACETOPHENONE

To a slurry of 52 g. of alpha-amino-4-benzylmercaptoacetophenone hydrochloride, 250 ml. of water and 500 g. of ice there was added 40 ml. of acetic anhydride followed by the immediate addition of a solution of 60 g. of sodium acetate trihydrate in 250 ml. of water. The reaction mixture was stirred and allowed to warm to room temperature (about 25° C.), and was then made acid to Congo by addition of hydrochloric acid. The solid was separated from the mixture by filtration, washed with water, and dried. A small sample of this product was purified by recrystallization from acetone. There was thus obtained alpha-acetylamino-4-benzylmercaptoacetophenone, having the formula

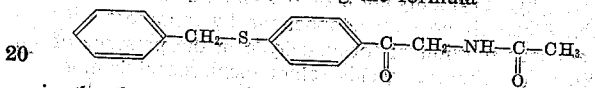

in the form of white needles which melted at 162.6–163.8° C.

C. ALPHA-ACETYLAMINO-BETA-HYDROXY-4-BENZYLMERCAPTOPROPIOPHENONE

The crude product from part B was slurried and warmed at 40° C. with 3.5 liters of ethanol. To this mixture were added 45 ml. of formalin (37% aqueous solution of formaldehyde), and 4 g. of sodium bicarbonate. Stirring of the reaction mixture at 40° C. was continued for twenty-four hours. The suspended sodium bicarbonate was removed from the solution by filtration and the filtrate was evaporated to a volume of about 100 ml., diluted with water, and the white solid which separated from solution was collected on a filter. There was thus obtained 49 g. of pale yellow solid. This product was recrystallized once from ethylene chloride and once from nitroethane. There was thus obtained alpha-acetylamino-beta-hydroxy-4-benzylmercaptopropiophenone, having the formula

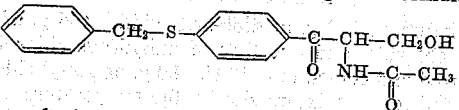

which melted at approximately 161° C.

D. 2-ACETYLAMINO-1-(4-BENZYLMERCAPTOPHENYL)-1,3-PROPANEDIOL

A mixture of 23 g. of alpha-acetylamino-beta-hydroxy-4-benzylmercaptopropiophenone, 30 g. of aluminum isopropoxide, and one liter of dry isopropanol was refluxed for eighteen hours. During this time isopropanol and acetone was allowed to distil slowly from the reaction mixture. The remaining isopropanol was then distilled off under reduced pressure and the dark red residue was heated for thirty minutes with about 200 ml. of 5% aqueous sodium chloride solution on a steam bath. The mixture was filtered and the residue thus collected was heated with 200 ml. of ethylene chloride. The mixture was filtered hot to remove aluminum hydroxide, and the filtrate was cooled. 11 g. of solid separated from the cooled filtrate. This solid was collected and purified by recrystallization, first from nitroethane, then from isopropanol, and finally, again from nitroethane. There was thus obtained, in the form of white leaflets which melted at 157.0–158.0° C., 2-acetylamino-1-(4-benzylmercaptophenyl)-1,3-propanediol.

EXAMPLE 9

2-dichloroacetylamino-1-(4-benzylmercaptophenyl)-1,3-propanediol

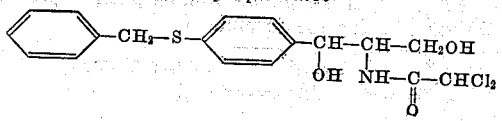

12 g. of alpha-amino-4-benzylmercaptoacetophenone hydrochloride (obtained as described above in part A of Example 8), 8 g. of dichloroacetyl chloride, and 500 ml. of dry benzene were refluxed for seven hours. The hot solution was then filtered, 5 g. of solid residue was collected on the filter and the benzene filtrate on cooling yielded an additional 8 g. of the same product, which was alpha-dichloroacetylamino-4-benzylmercaptoacetophenone, having the formula

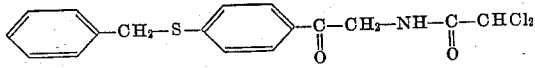

This product was purified by crystallization, first from ethylene chloride and then from nitroethane. The pure compound melted at 185.6–186.4° C.

Proceeding in the manner set forth in the above examples, hydroxymethylation of the alpha-dichloroacetyl-amino-4-benzylmercaptoacetophenone by treatment with an aqueous solution of formaldehyde in the presence of sodium bicarbonate yields alpha-dichloroacetylamino-beta-hydroxy-4-benzylmercaptophenylacetophenone, having the formula

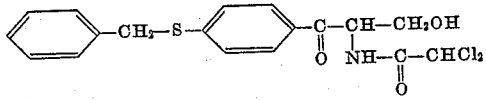

Reduction of this compound with aluminum isopropoxide in isopropanol yields 2-dichloroacetylamino-1-(4-benzylmercaptophenyl)-1,3-propanediol.

EXAMPLE 10

*2-dichloroacetylamino-1-(4-phenylmercaptophenyl)-1,3-propanediol*

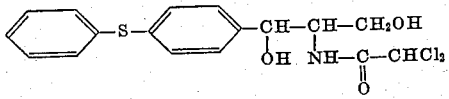

A. ALPHA-AMINO-4-PHENYLMERCAPTOACETOPHENONE HYDROCHLORIDE

A mixture of 190 g. of diphenyl sulfide, 146 g. of aluminum chloride, and one liter of anhydrous chloroform was stirred and cooled to −5° C. 80 g. of acetyl chloride was added to the mixture slowly, the temperature of the mixture being kept at −5° C. to +5° C. When all of the acetyl chloride had been added, stirring was continued for one hour while the reaction mixture was gradually allowed to warm to room temperature. The mixture was then poured into ice water. The chloroform layer was separated from the mixture and the chloroform was removed from the chloroform solution by distillation under reduced pressure. The residue thus obtained was dissolved in a hot mixture of 150 ml. of benzene and 150 ml. of petroleum ether. When the solution was cooled, 158 g. of 4-phenylmercaptoacetophenone, having the formula

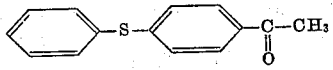

separated from solution. This product melted at approximately 66° C.

A solution of 53 g. of 4-phenylmercaptoacetophenone in 500 ml. of chloroform was treated with 36 g. of bromine at room temperature. After the bromination was completed, and excess hydrogen bromide was removed from the reaction mixture, a sufficient quantity of 5% aqueous sodium bicarbonate solution was added to render the mixture alkaline to litmus. The chloroform layer was separated and distilled under reduced pressure to remove the chloroform. There was thus obtained as an oil, 69 g. of crude alpha-bromo-4-phenylmercaptoacetophenone, having the formula

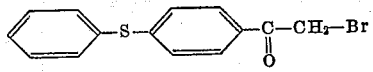

The 69 g. of oil was dissolved in 400 ml. of acetonitrile and 32.6 g. of hexamethylenetetramine was added to the solution. The mixture was stirred for thirty minutes and the white creamy solid was then collected on a filter. There was thus obtained 100 g. of crude alpha-bromo-4-phenylmercaptoacetophenone - hexamethylenetetramine adduct, having the formula

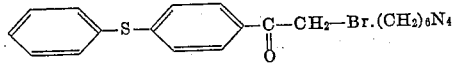

which melted with decomposition at approximately 206° C. This product was stirred and heated on a steam bath for fifteen minutes with 250 ml. of ethanol and 120 ml. of concentrated hydrochloric acid. The ammonium chloride which separated from the mixture was removed by filtration and the filtrate was allowed to stand for several hours at room temperature. The white solid which separated from the solution was collected on a filter, dissolved in hot anhydrous ethanol, filtered hot with charcoal, and the filtrate was cooled. There separated from the cooled solution 22 g. of alpha-amino-4-phenylmercaptoacetophenone hydrochloride, having the formula

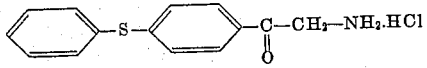

which melted at 216.7–217.0° C. (dec.).

B. ALPHA-DICHLOROACETYLAMINO-4-PHENYLMERCAPTOACETOPHENONE

A mixture of 22 g. of alpha-amino-4-phenylmercaptoacetophenone hydrochloride, 37 g. of dichloroacetyl chloride, and 150 ml. of dry benzene was heated under reflux for thirty minutes. The hot reaction mixture was then filtered. 12 g. of alpha-dichloroacetylamino-4-phenylmercaptoacetophenone separated from the filtrate on cooling. This product melted at 138.5–139.7° C.

C. ALPHA-DICHLOROACETYLAMINO-BETA-HYDROXY-4-PHENYLMERCAPTOPROPIOPHENONE

A mixture of 17 g. of alpha-dichloroacetylamino-4-phenylmercaptoacetophenone, 125 ml. of ethanol, 10 ml. of formalin (37% aqueous solution of formaldehyde), and 1 g. of sodium bicarbonate was stirred and heated at 40° C. for one hour and then allowed to stand for several hours at room temperature (about 25° C.). The reaction mixture was then reheated to 40° C., filtered to remove sodium bicarbonate, and the filtrate cooled. 11 g. of solid separated from the cooled filtrate. This product was recrystallized from ethylene chloride, thereby yielding 10.5 g. of pure alpha-dichloroacetyl-amino-beta-hydroxy-4-phenylmercaptoacetophenone, having the formula

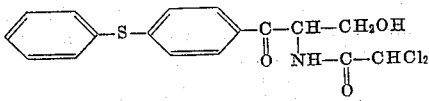

which melted at 128.5–129.5° C.

D. 2-DICHLOROACETYLAMINO-1-(4-PHENYLMERCAPTOPHENYL)-1,3-PROPANEDIOL

A mixture of 10 g. of alpha-dichloroacetylamino-beta-hydroxy-4-phenylmercaptopropiophenone, 20.4 g. of aluminum isopropoxide, and 100 ml. of dry isopropanol was distilled slowly for forty-five minutes. The excess isopropanol was then removed by distillation under reduced pressure and the residue was heated for thirty minutes with 100 ml. of 15% aqueous sodium chloride solution. The aluminum hydroxide which separated from the mixture was collected on a filter and washed thoroughly with ether. The aqueous filtrate was also extracted with ether, and the ether washings and extracts were combined and dried over anhydrous calcium sulfate. The ether was then distilled from the filtrate under reduced pressure. There was thus obtained as a residue 5.0 g. of 2- dichloroacetylamino-1-(4-phenylmercaptophenyl)-1,3-propanediol in the form a red oil.

Proceeding in accordance with the teachings of the above examples, there can be prepared the following compounds:

2-iodoacetyl-1-[4-(p-tolylmercapto)phenyl]-1,3-propanediol, by hydroxymethylating alpha-iodoacetylamino-4-(p-tolylmercapto)acetophenone and reducing the alpha-iodoacetylamino-beta-hydroxy-4-(p-tolylmercapto)propiophenone thus obtained;

2-beta-chloropropionylamino-1-(4-cyclohexylmercaptophenyl)-1,3-propanediol, by hydroxymethylating alpha-(beta-chloropropionylamino-4-cyclohexylmercaptoacetophenone and reducing the alpha-(beta-chloropropionylamino)-beta-hydroxy-4-cyclohexylmercaptopropiophenone thus obtained;

2-acetylamino-1-(4-methallylmercaptophenyl)-1,3-propanediol, by hydroxymethylating alpha-acetylamino-4-methallylmercaptoacetophenone and reducing the alpha-acetylamino-beta-hydroxy-4-methallylmercaptopropiophenone thus obtained;

2-trifluoroacetylamino-1-(4-methallylmercaptophenyl)-1,3-propanediol, by interacting ethyl trifluoroacetate and 2-amino-1-(4-methallylmercaptophenyl)-1,3-propanediol obtained by deacylating the corresponding 2-acetylamino compound;

2-(alpha-methylpropionylamino)-1-(4-isobutylmercaptophenyl)-1,3-propanediol, by interacting 2-amino-1-(4-isobutylmercaptophenyl)-1,3-propanediol with alpha-methylpropionyl chloride; and 2-(alpha,beta-dichloropropionylamino)-1-(4-tert.-butylmercaptophenyl)-1,3-propanediol, by hydroxymethylating alpha-(alpha,beta-dichloropropionylamino)-4-tert.-butylmercaptoacetophenone and reducing the alpha-(alpha,beta-dichloropropionylamino)-beta-hydroxy-4-tert.-butylmercaptopropiophenone thus obtained.

We claim:

1. A 2-lower aliphatic carboxylic acylamino-1-(4-hydrocarbylmercaptophenyl)-1,3-propanediol having the formula

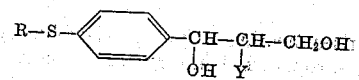

where R is a hydrocarbyl radical having 1–7 carbon atoms and Y is a lower aliphatic carboxylic acylamino radical.

2. A 2-halo-lower alkanoylamino-1-(4-hydrocarbylmercaptophenyl)-1,3-propanediol having the formula

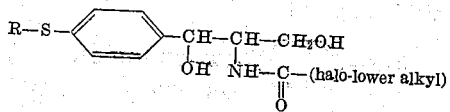

where R is a hydrocarbyl radical having 1–7 carbon atoms.

3. A 2-halo-lower alkanoylamino-1-(4-alkylmercaptophenyl)-1,3-propanediol having the formula

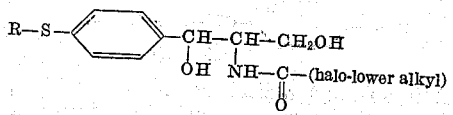

where R is an alkyl radical having 1–7 carbon atoms.

4. A 2-dichloroacetylamino-1-(4-alkylmercaptophenyl)-1,3-propanediol having the formula

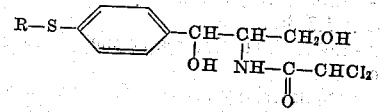

where R is an alkyl radical having 1–7 carbon atoms.

5. The process for obtaining a 2-lower aliphatic carboxylic acylamino-1-(4-hydrocarbylmercaptophenyl)-1,3-propanediol having the formula

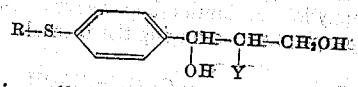

where R is a hydrocarbyl radical having 1–7 carbon atoms and Y is a lower aliphatic carboxylic acylamino radical; which comprises treating an alpha-lower aliphatic carboxylic acylamino-4-hydrocarbylmercaptoacetophenone having the formula

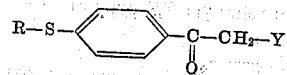

with formaldehyde in the presence of a small amount of sodium bicarbonate, thereby producing an alpha-lower aliphatic carboxylic acylamino-beta-hydroxy-4-hydrocarbylmercaptopropiophenone having the formula

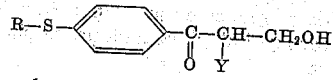

and reducing the alpha-lower aliphatic carboxylic acylamino-beta-hydroxy-4-hydrocarbylmercaptopropiophenone thus obtained by treating it with an oxidizable aluminium lower alkoxide.

6. The process for obtaining a 2-halo-lower alkanoylamino-1-(4-alkyl-mercaptophenyl)-1,3-propanediol having the formula

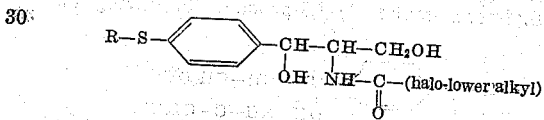

where R is an alkyl radical having 1–7 carbon atoms, which comprises treating an alpha-(halo-lower alkanoyl-amino)-4-alkylmercaptoacetophenone having the formula

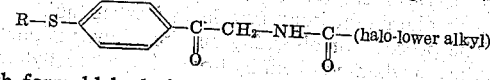

with formaldehyde in the presence of a small amount of sodium bicarbonate, thereby producing an alpha-(halo-lower alkanoylamino)-beta-hydroxyl-4-alkylmercaptopropiophenone having the formula

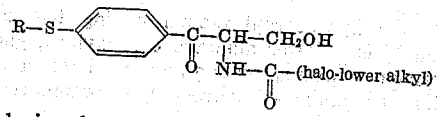

and reducing the alpha-(halo-lower alkanoylamino)-beta-hydroxy-4-alkylmercaptopropiophenone thus obtained by treating it with an oxidizable aluminum lower alkoxide.

7. The process for obtaining a 2-dichloroacetylamino-1-(4-methylmercaptophenyl)-1,3-propanediol having the formula

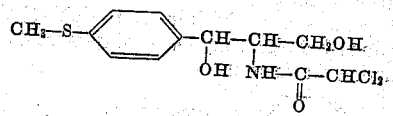

which comprises treating an alpha-dichloroacetylamino-4-methylmercaptoacetophenone with formaldehyde in the presence of a small amount of sodium bicarbonate, thereby producing an alpha-dichloroacetylamino-beta-hydroxy-4-methyl-mercaptopropiophenone, and reducing the alpha-dichloroacetylamino-beta-hydroxy-4-methylmercaptopropiophenone thus obtained by treating it with aluminum isopropoxide in isopropanol.

8. The process for obtaining a 2-lower aliphatic carboxylic acylamino-1-(4-hydrocarbylmercaptophenyl)-1,3-propanediol having the formula

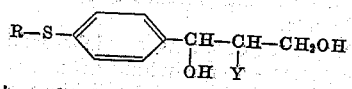

where R is a hydrocarbyl radical having 1–7 carbon atoms and Y is a lower aliphatic carboxylic acylamino radical, which comprises reducing an alpha-lower aliphatic carboxylic acylamino-beta-hydroxy-4-hydrocarbylmercaptopropiophenone having the formula

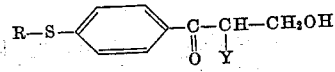

by treating it with an oxidizable aluminum lower alkoxide.

9. The process for obtaining a 2-dichloroacetylamino-1-(4-alkylmercaptophenyl)-1,3-propanediol having the formula

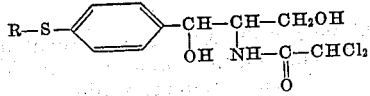

where R is an alkyl radical having 1-7 carbon atoms, which comprises reducing an alpha-(dichloroacetylamino)-beta-hydroxy-4-alkylmercaptopropiophenone having the formula

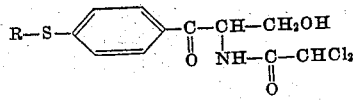

by treating it with an oxidizing aluminum lower alkoxide.

10. The process for obtaining a 2-dichloroacetylamino-1-(4-methylmercaptophenyl)-1,3-propanediol having the formula

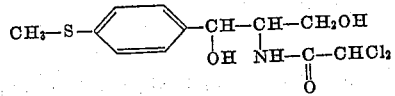

which comprises reducing an alpha-dichloroacetylamino-beta-hydroxyl-4-methylmercaptopropiophenone by treating it with aluminum isopropoxide in isopropanol.

11. The process for obtaining an alpha-lower aliphatic carboxylic acylamino-beta-hydroxyl-4-hydrocarbylmercaptopropiophenone having the formula

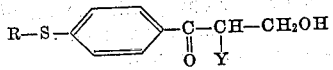

where R is a hydrocarbyl radical having 1-7 carbon atoms and Y is a lower aliphatic carboxylic acylamino radical, which comprises treating an alpha-lower aliphatic carboxylic acylamino-4-hydrocarbylmercaptoacetophenone having the formula

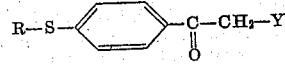

with formaldehyde in the presence of a small amount of sodium bicarbonate.

12. The process for obtaining an alpha-(halo-lower alkanoylamino)-beta-hydroxy-4-alkylmercaptopropiophenone having the formula

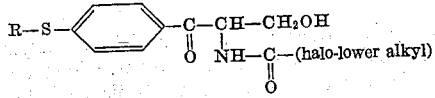

where R is an alkyl radical having 1-7 carbon atoms, which comprises treating an alpha-(halo-lower alkanoylamino)-4-alkylmercaptoacetophenone having the formula

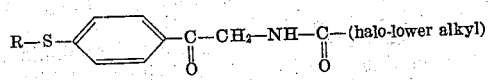

with formaldehyde in the presence of a small amount of sodium bicarbonate.

13. The process for obtaining an alpha-dichloroacetylamino-beta-hydroxy-4-methylmercaptopropiophenone, which comprises treating an alpha-dichloroacetylamino-4-methylmercaptoacetophenone with formaldehyde in the presence of a small amount of sodium bicarbonate.

14. The process for obtaining a 2-lower aliphatic carboxylic acylamino-1-(4-hydrocarbylmercaptophenyl)-1,3-propanediol having the formula

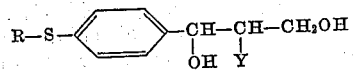

where R is a hydrocarbyl radical having 1-7 carbon atoms and Y is a lower aliphatic carboxylic acylamino radical, which comprises heating a 2-amino-1-(4-hydrocarbylmercaptophenyl)-1,3-propanediol having the formula

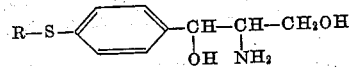

with a lower alkyl halo-lower alkanoate.

15. The process for obtaining a 2-halo-lower alkanoylamino-1-(4-alkylmercaptophenyl)-1,3-propanediol having the formula

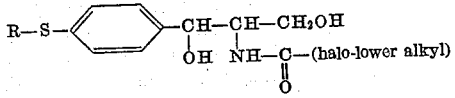

where R is an alkyl radical having 1-7 carbon atoms, which comprises heating a 2-amino-1-(4-alkylmercaptophenyl)-1,3-propanediol having the formula

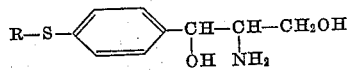

with a lower alkyl halo-lower alkanoate.

16. The process for obtaining a 2-dichloroacetylamino-1-(4-methylmercaptophenyl)-1,3-propanediol having the formula

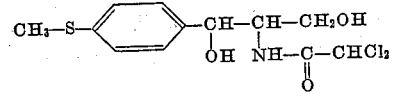

which comprises heating a 2-amino-1-(4-methylmercaptophenyl)-1,3-propanediol having the formula

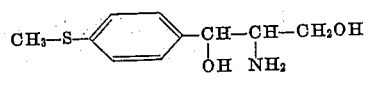

with a lower alkyl dichloroacetate.

17. A 2-amino-1-(4-hydrocarbylmercaptophenyl)-1,3-propanediol having the formula

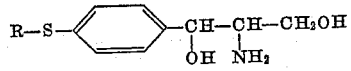

where R is a hydrocarbyl radical having 1-7 carbon atoms.

18. A 2-amino-1-(4-alkylmercaptophenyl)-1,3-propanediol having the formula

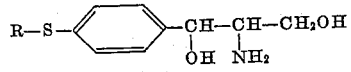

where R is an alkyl radical having 1-7 carbon atoms.

19. 1-(P-methylmercaptophenyl)-2-dichloroacetamidopropane-1,3-diol.

20. 1-(P-methylmercaptophenyl)-2-aminopropane-1,3-diol.

21. 1-(P-lower alkylmercaptophenyl)-2-dichloracetamido-propane-1,3-diol.

22. 1-(P-lower alkylmercaptophenyl)-2-aminopropane-1,3-diol.

23. The antibacterially-active dextro-rotary 1-(p-methylmercaptophenyl)-2-dichloroacetamido-1,3-propanediol substantially free from the antibacterially-inactive levo-rotary enantiomer.

24. A compound of the formula

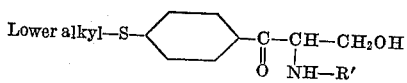

wherein R' is a lower saturated aliphatic carboxy acyl group.

25. A compound of the formula

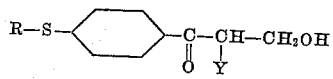

where R is a hydrocarbyl radical having 1-7 carbon atoms and Y is a lower aliphatic carboxylic acylamino radical.

26. A compound of the formula

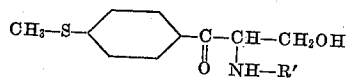

wherein R' is a lower saturated aliphatic carboxy acyl group.

27. A compound of the formula

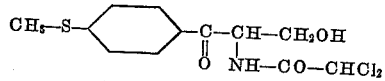

28. A compound of the formula

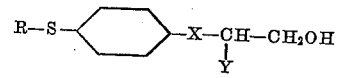

where R is a hydrocarbyl radical having 1-7 carbon atoms, X is a member of the group consisting of >C=O and >CHOH, and Y is a lower aliphatic carboxylic acylamino radical.

References Cited in the file of this patent

UNITED STATES PATENTS

| | | |
|---|---|---|
| 2,514,376 | Crooks et al. | July 11, 1950 |
| 2,538,763 | Crooks et al. | Jan. 23, 1951 |
| 2,538,764 | Crooks et al. | Jan. 23, 1951 |